US008085255B2

(12) United States Patent
Lu et al.

(10) Patent No.: US 8,085,255 B2
(45) Date of Patent: Dec. 27, 2011

(54) METHOD FOR ZOOMING IMAGE

(75) Inventors: Chia-Yi Lu, Taoyuan County (TW); Chia-Yu Wang, Taipei County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 1111 days.

(21) Appl. No.: 11/871,139

(22) Filed: Oct. 11, 2007

(65) Prior Publication Data

US 2008/0266327 A1 Oct. 30, 2008

(30) Foreign Application Priority Data

Apr. 30, 2007 (TW) ................................ 96115252 A

(51) Int. Cl.
*G06F 3/038* (2006.01)
*G09G 5/00* (2006.01)

(52) U.S. Cl. ........................................ 345/204; 345/660

(58) Field of Classification Search .................. 345/204, 345/87, 660, 661, 666, 667, 619
See application file for complete search history.

(56) References Cited

U.S. PATENT DOCUMENTS 6,559,839 B1 5/2003 Ueno et al.
6,618,032 B1 9/2003 Seino
6,903,716 B2 * 6/2005 Kawabe et al. ................ 345/99
2006/0125937 A1 * 6/2006 LeGall et al. ........... 348/240.99

FOREIGN PATENT DOCUMENTS

CN 1308311 8/2001
JP 05-167957 7/1993
JP 2002311901 10/2002
JP 2003330423 11/2003

OTHER PUBLICATIONS

"1st Office Action of China counterpart application", issued on Jul. 3, 2009, p. 1-p. 4.

* cited by examiner

*Primary Examiner* — Ricardo L Osorio
(74) *Attorney, Agent, or Firm* — Jianq Chyun IP Office

(57) ABSTRACT

A method and apparatus for zooming an image. In the present method, a plurality of scan periods and a plurality of scan data are provided, wherein the $i_{th}$ scan data is provided in the $i_{th}$ scan period. The $j_{th}$ scan data is used to drive at least two adjacent scan lines within the $j_{th}$ scan period, wherein i, j are natural numbers.

4 Claims, 6 Drawing Sheets

METHOD FOR ZOOMING IMAGE

CROSS-REFERENCE TO RELATED APPLICATION

This application claims the priority benefit of Taiwan application serial no. 96115252, filed Apr. 30, 2007. All disclosure of the Taiwan application is incorporated herein by reference.

BACKGROUND OF THE INVENTION

1. Field of Invention

The present invention relates to a method of zooming an image, and more particularly to a method and apparatus for zooming an image, capable of enhancing image quality.

2. Description of Related Art

With the development of high-tech, video products, especially digital video or image devices, have become quite common products in daily life. Among these digital video or image devices, a display is a key element for displaying relevant information. A user may read information by the use of the display, or further control the operation of the device.

Currently, the most notable display is a flat panel display, for example, a liquid crystal display (LCD) developed based on photoelectric technology and semiconductor manufacturing technology. Due to the advantages of low-voltage operation, radiation free, light weight, and small volume, LCD has become an important topic in display research. Especially, a large size LCD-TV actively developed in the art has become a mainstream product in large size flat panel TVs due to the advantages of large size, high image quality, high luminance, and wide viewing angle.

FIG. 1 shows a conventional flat panel display module. As shown in FIG. 1, the conventional flat panel display module includes a flat panel display 11, a timing controller 13, a scan driving IC 14, and a data driving IC 15. The flat panel display 11 is, for example, a common thin film transistor LCD (TFT-LCD).

The timing controller 13 outputs scan data and a control signal to the data driving IC, and outputs the control signal to the scan driving IC. When the scan driving IC opens the TFT of each scan line, the data driving IC converts the corresponding scan data to a voltage, and charges or discharges a capacitor in a liquid crystal panel to a voltage corresponding to a gray level.

FIG. 2 shows a timing chart of a conventional timing controller in FIG. 1 for outputting the control signal to the scan driving IC. As shown in FIG. 2, the $1_{st}$ to $12_{th}$ scan driving signals OUT1-OUT12 (others are not shown), an output enable (OE) signal, a scan clock signal CLKV, and an activating signal STV are shown. The activating signal STV is used to activate the scan driving signal OUT1, and when the activating signal STV is enabled, after the scan clock signal CLKV is enabled, the scan driving signal OUT1 is enabled. When the activating signal STV is disabled, after the scan clock signal CLKV is enabled, the scan driving signal OUT1 is disabled.

The output enable signal OE is used to adjust pulse interval of the scan driving signal OUT output by the scan driving IC 14. When the output enable signal is enabled, the scan driving signal is disabled to ensure that the TFT of the $(n+1)_{th}$ scan line will not be opened until the TFT of the $n_{th}$ scan lines is closed, so as to prevent the capacitor from being charged improperly.

However, in this conventional method, only one output enable signal OE is utilized, and only the capacitor of the conventional flat panel display is charged or discharged. Despite that the capacitor is prevented from being charged improperly, the function is too simple, so the products manufactured with the conventional art have low competitive ability in the current era in pursuit of multiple functions and efficiency.

In consideration of the facts that people pursue higher life quality, and travel and leisure become popular, video-player devices and flat panel displays are developed to be used in vehicles for travelers to dismiss time in the vehicles during a long trip. However, due to the limitation of the vehicle space, the size of the car display is not large. Therefore, in order to enhance the comfort of viewers, the flat panel display inevitably has the problem of image zooming.

SUMMARY OF THE INVENTION

The present invention is directed to a method of zooming an image. In the method, a plurality of scan period and a plurality of scan data are provided, wherein the $i_{th}$ scan data is provided in the $i_{th}$ scan period. In the $j_{th}$ scan period, at least two adjacent scan lines are drived with the $j_{th}$ scan data, wherein i and j are natural numbers, thereby increasing the functions of a flat panel display module, solving the problem of image zooming, enhancing the comfort of viewers of a flat panel display, preventing a TFT from being charged improperly, and enhancing the image quality.

The present invention is further directed to an apparatus of zooming an image, which includes a zoom mode detector and a timing corrector. The zoom mode detector is used to output a zoom determine signal, and the timing corrector is coupled to a zoom determine device to receive the zoom determine signal, so as to output a first, a second, and a third output enable signals. When the zoom determine signal is enabled, two of the first, the second, and the third output enable signals are disabled, thereby zooming an image of the flat panel display, alleviating the discomfort of the viewer, enhancing the accurate rate of charging the TFT, and enhancing the image quality.

As broadly described and embodied herein, the method of zooming an image provided by the present invention is applied to a flat panel display having a plurality of scan lines. In the method, a plurality of scan periods and a plurality of scan data are provided, wherein the $i_{th}$ scan data is provided the $i_{th}$ scan period provides. In the $j_{th}$ scan period, at least two adjacent scan lines are drived with the $j_{th}$ scan data, wherein i and j are natural numbers.

In the method of zooming an image according to an embodiment of the present invention, a scan clock signal is further provided, wherein when the scan clock signal is enabled for $k_{th}$ time, a $k_{th}$ scan line is activated, in which k is a natural number. The scan clock signal is operated at a first frequency in the $i_{th}$ scan period and the scan clock signal is operated at a second frequency in the $j_{th}$ scan period. The second frequency is higher than the first frequency, and in the $j_{th}$ scan period, the scan clock signal is enabled for at least twice.

In the method of zooming an image according to an embodiment of the present invention, a plurality of scan driving signals corresponding to the scan lines are provided, respectively. The scan driving signals are enabled sequentially according to the scan clock signal, so as to activate the scan lines correspondingly in sequence. An output enable signal is provided, in which when the output enable signal is enabled, the scan driving signals are disabled. The output enable signal is enabled at least one predetermined time before the scan clock signal is enabled, and disabled at least the predetermined time after the scan clock signal is enabled.

In the method of zooming an image according to an embodiment of the present invention, the time of enabling the output enable signal is smaller than the scan period.

In the method of zooming an image according to an embodiment of the present invention, a first, a second, and a third output enable signals are further provided. When the first output enable signal is enabled, a corresponding $(3m-2)_{th}$ scan line is disabled; when the second output enable signal is enabled, a corresponding $(3m-1)_{th}$ scan line is disabled; and when the third output enable signal is enabled, a corresponding $3m_{th}$ scan line is disabled, in which m is a natural number.

In the method of zooming an image according to an embodiment of the present invention, the scan period is a horizontal synchronizing cycle.

In the method of zooming an image according to an embodiment of the present invention, the flat panel display is an LCD.

An apparatus of zooming an image for a flat panel display having a plurality of scan lines is provided by the present invention. The apparatus includes a zoom mode detector and a timing corrector. The zoom mode detector is used to output a zoom determine signal. The timing corrector is coupled to the zoom determine device to receive the zoom determine signal, for outputting a first, a second, and a third output enable signals. When the zoom determine signal is enabled, two of the first, the second, and the third output enable signals are disabled.

In the apparatus of zooming an image according to an embodiment of the present invention, the apparatus further includes a vertical timing generating circuit, coupled to the zoom mode detector, for generating a vertical timing.

In the apparatus of zooming an image according to an embodiment of the present invention, the apparatus further includes an output circuit, for enhancing a driving force of the first, the second, and the third output enable signals.

In the apparatus of zooming an image according to an embodiment of the present invention, the timing corrector is further used to output a scan clock signal. When the zoom determine signal is enabled, a first frequency of the scan clock signal is adjusted to a second frequency, in which the second frequency is higher than the first frequency.

In the method of zooming an image provided by the present invention, a plurality of scan periods and a plurality of scan data are provided, wherein the $i_{th}$ scan data is provided in the $i_{th}$ scan period. In the $j_{th}$ scan period, at least two adjacent scan lines are drived with the $j_{th}$ scan data, wherein i and j are natural numbers, thereby improving the functions of the flat panel display module, solving the problem of image zooming in the flat panel display, preventing the TFT from being charged improperly, enhancing the image quality, and enhancing the comfort of the viewer.

In order to make the aforementioned and other objects, features and advantages of the present invention comprehensible, preferred embodiments accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The output enable signal in the conventional art is merely designed and used to adjust the pulse interval between the scan driving signals output by the scan driving IC to ensure that the TFT of the scan line will not be opened until the TFT of the preceding scan line is closed, so as to prevent the capacitor from being charged improperly. In consideration of zoom function required by analog systems, for example, automotive electronics market, the present invention provides a method for zooming an image, thus enhancing the functions of a flat panel display module, solving the problem of image zooming, enhancing the comfort of the viewer of the flat panel display, preventing the TFT from being charged improperly, and enhancing image quality. The present invention will be illustrated with the following embodiments.

Figure 1:
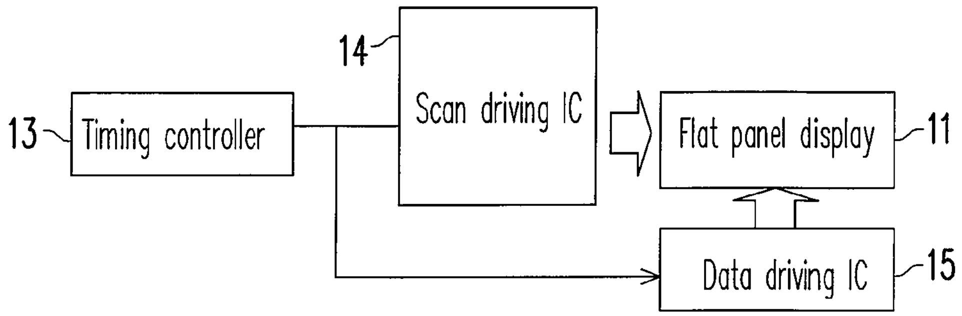
FIG. 1 (PRIOR ART)
FIG. 1 shows a conventional flat panel display module.
Figure 2:
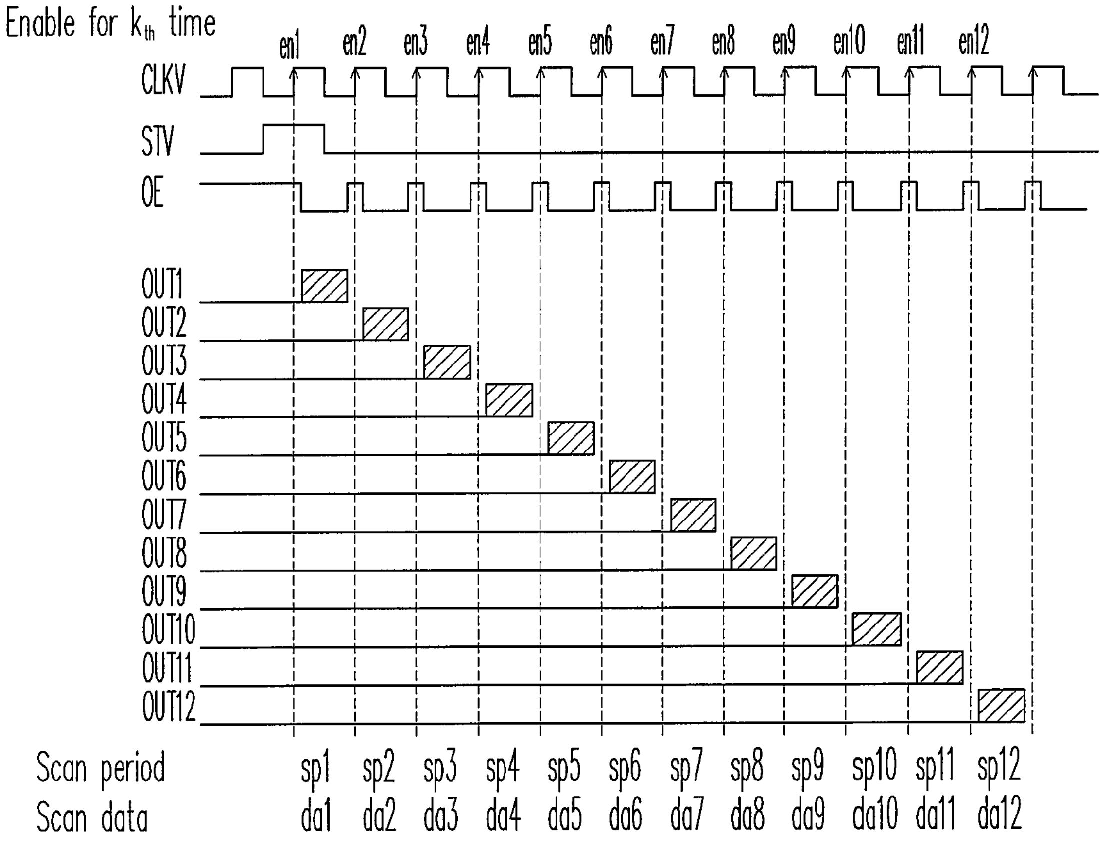
FIG. 2 (PRIOR ART)
FIG. 2 shows a timing chart of a conventional timing controller in FIG. 1 for outputting a control signal to the scan driving IC.
Figure 3:
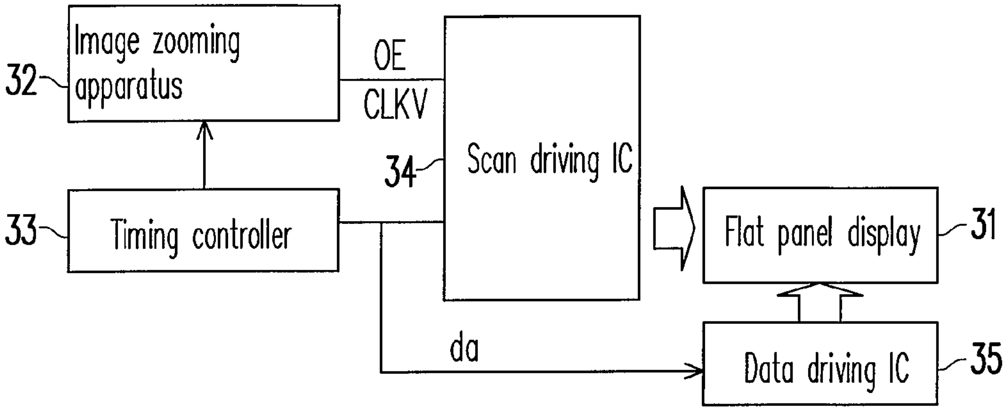
FIG. 3 shows a flat panel display module using the apparatus for zooming an image in an embodiment of the present invention.

FIG. 3 shows a flat panel display module adopting the apparatus for zooming an image in an embodiment of the present invention. As shown in FIG. 3, the flat panel display module includes a flat panel display 31, an image zooming apparatus 32, a timing controller 33, a scan driving IC 34, and a data driving IC 35. The timing controller 33 outputs scan data and a control signal to the data driving IC 35, outputs the control signal to the scan driving IC 34, and outputs the control signal to the image zooming apparatus 32. The image zooming apparatus 32 generates an output enable signal OE and a scan clock signal CLKV to the scan driving IC 34.

The scan driving IC 34 adjusts the pulse interval of the scan driving signals of a plurality of scan lines according to the output enable signal OE and the scan clock signal CLKV. The data driving IC 35 outputs each scan data in each scan period sequentially according to the control signal. When each scan driving signal opens the TFT of the corresponding scan line, the scan data charges or discharges the capacitor in the corresponding LCD to a voltage corresponding to a gray level, thereby finishing the display action.

Figure 4:
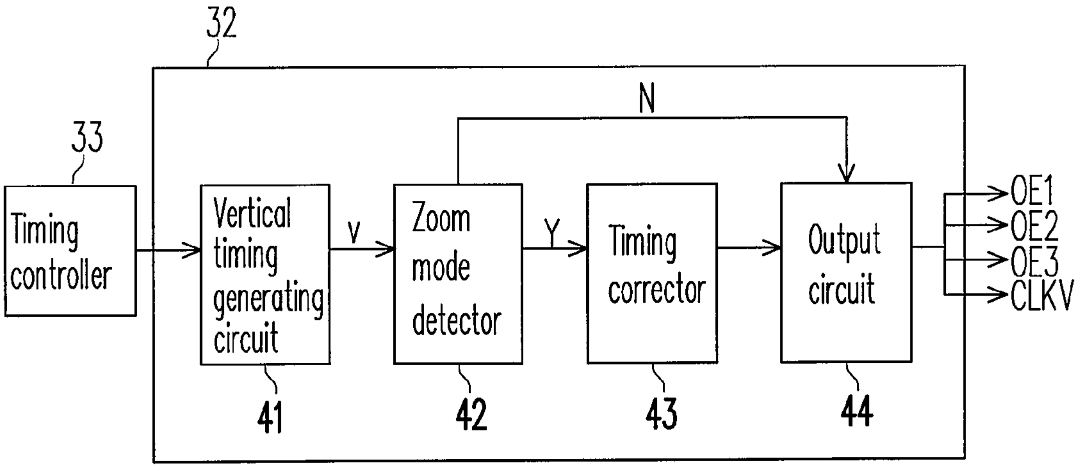
FIG. 4 shows the apparatus for zooming an image in an embodiment of the present invention.

FIG. 4 shows the apparatus for zooming an image in an embodiment of the present invention. As shown in FIG. 4, the image zooming apparatus 32 includes a vertical timing generating circuit 41, a zoom mode detector 42, a timing corrector 43, and an output circuit 44. The timing generator in FIG. 4 may be a pulse generator.

Referring to FIGS. 4 and 3, the vertical timing generating circuit 41 receives an output signal of the timing controller 33 and generates a timing required by the scan driving IC 34. The zoom mode detector 42 determines whether to zoom in an image or remain it normal and whether to enter a zoom mode according to a vertical timing v generated by the vertical timing generating circuit 41. If the image is zoomed in, a zoom determine signal Y is outputted; and if the image needs to be remained normal, a zoom determine signal N is output, so as to directly output the image without being zoomed by the timing corrector 43.

The timing corrector 43 receives a zoom determine signal Y to output a first output enable signal OE1, a second output enable signal OE2, a third output enable signal OE3, and a scan clock signal CLKV to the output circuit 44. The output circuit 44 enhances the driving force of the output enable signals OE1-OE3, and then outputs the output enable signals OE1-OE3 and the scan clock signal CLKV.

Figure 5:
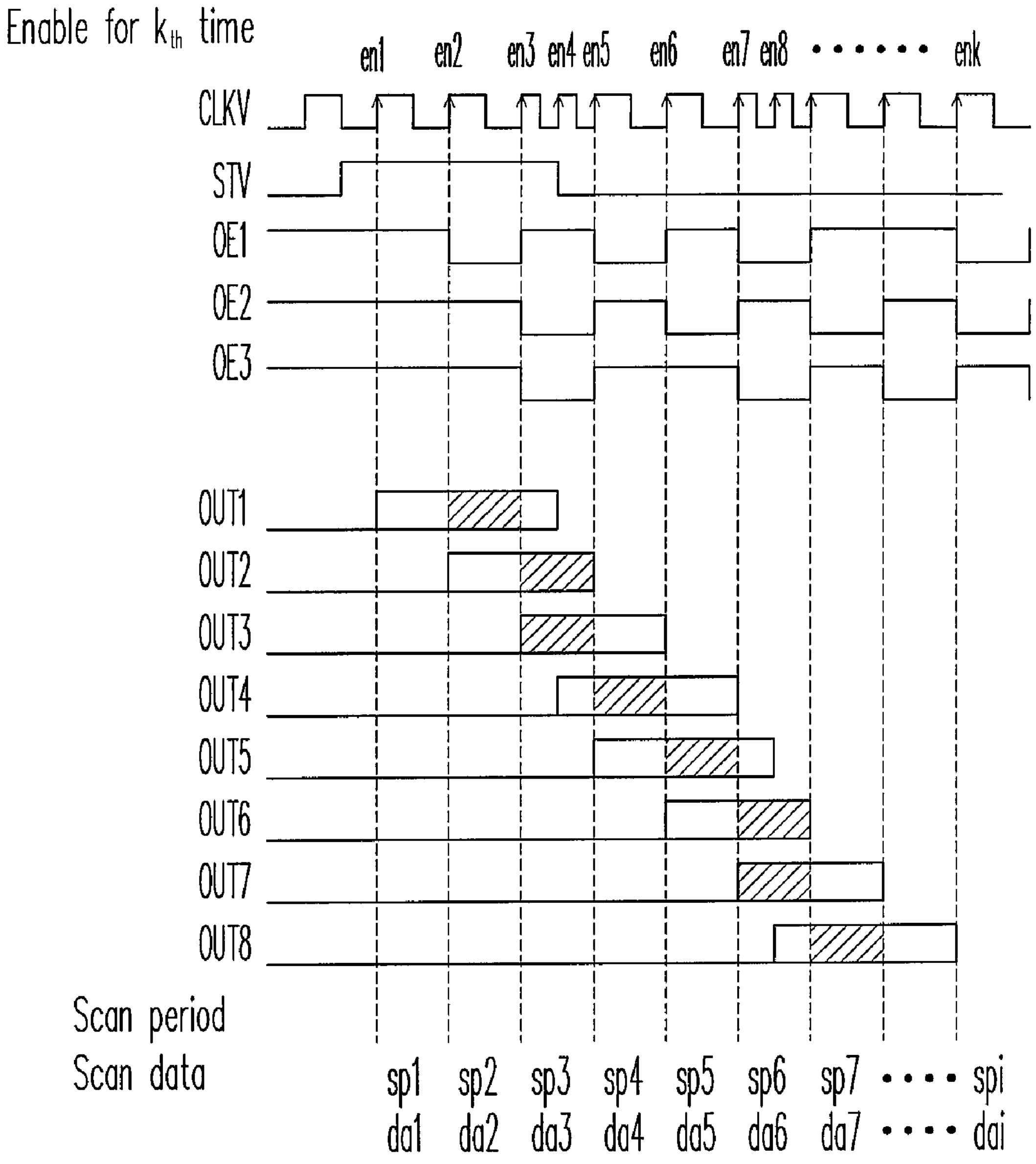
FIG. 5 is a timing chart in an embodiment in FIG. 4.

FIG. 5 is a timing chart in the embodiment in FIG. 4. As shown in FIG. 5, the $1_{st}$ to $8_{th}$ scan driving signals OUT1-OUT8 (the rest not shown), the output enable signals OE1-OE3, the scan clock signal CLKV, and the activating signal STV are shown. The activating signal STV is used to activate the first output enable signal OE1, and when the activating signal STV is enabled, after the scan clock signal CLKV is enabled, the scan clock signal CLKV is regarded as enabled for the first time en1, and the scan driving signal OUT1 is enabled. When the activating signal STV is disabled, after the scan clock signal CLKV is enabled for the fourth time en4, the scan driving signal OUT1 is disabled.

The scan clock signal CLKV is enabled for the $k_{th}$ time enk, the $k_{th}$ scan line is activated, i.e., the scan driving signal OUTk is enabled. For example, when the scan clock signal CLKV is enabled for the first time en1, the scan driving signal OUT1 is enabled. When the scan clock signal CLKV is enabled for the third time en3, the scan driving signal OUT3 is enabled. When the scan clock signal CLKV is enabled for the fourth time en4, the scan driving signal OUT4 is enabled. Those of ordinary skill in the art should know the operation mode of the pulse shift of the scan driving signals OUT1-OUT8 may be accomplished through a shift register and the details will not be repeated herein.

Referring to FIGS. 4 and 5, the output enable signals OE1-OE3 correspond to the scan driving signals on the $(3m-2)_{th}$, the $(3m-1)_{th}$, and the $3m_{th}$ scan lines, respectively, in which m is a natural number. For example, the first output enable signal OE1 corresponds to the scan driving signals OUT1, OUT4, OUT7 . . . , the second output enable signal OE2 corresponds to the scan driving signals OUT2, OUT5, OUT8 . . . , and the third output enable signal OE3 corresponds to the scan driving signals OUT3, OUT6 . . . . When the output enable signal OE is enabled, the corresponding scan driving signal OUT is disabled.

In other words, the scan driving signal OUT1 should be enabled from the first scan period sp1 to the third scan period sp3. However, since the first output enable signal OE1 is enabled in the scan period sp1 and the scan period sp3, the scan driving signal OUT1 is enabled only in the scan period sp2. In a similar way, the scan driving signal OUT2 is enabled only in the scan period sp3.

During the scan period sp3, the output enable signals OE1, OE2, and OE3 are set in the enable, disable, and disable states, such that the scan driving signal OUT3 is enabled in the scan period sp3. As such, the scan driving signal OUT2 and the scan driving signal OUT3 are enabled in the same scan period sp3, and the same scan data da3 is written to the capacitors at the corresponding scan lines.

Likewise, during the scan period sp3, the scan clock signal CLKV operates at a frequency twice as high as a normal one, such that the scan driving signal OUT4 is enabled half of a scan period earlier. In response to the output enable signal OE1-OE3 in an enabled/disabled state, the scan driving signal OUT4 is enabled in the scan period sp4. Due to such a design, the scan driving signal OUT7 is enabled one scan period earlier, and the scan driving signals OUT6 and OUT7 are both enabled in the sixth scan period sp6, and the same scan data da6 is written into the capacitor at the corresponding scan lines. Therefore, the zooming function may be accomplished through controlling the work frequency of the scan clock signal CLKV and the enabling/disabling of the output enable signals OE1-OE3.

Figure 6A:
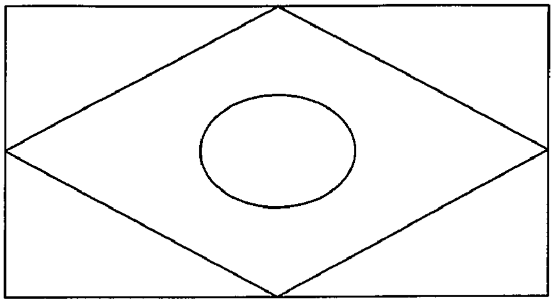
FIG. 6*a* shows an image displayed in a normal mode in an embodiment of the present invention.
Figure 6B:
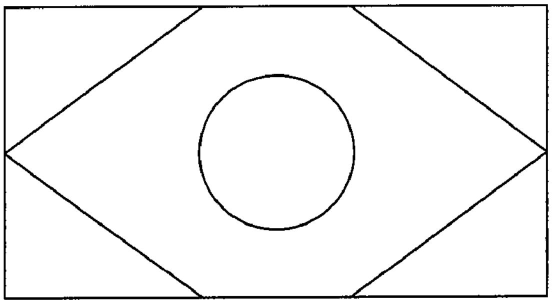
FIG. 6*b* shows an image displayed in a zoom mode in an embodiment of the present invention.

FIG. 6*a* shows an image displayed in a normal mode in an embodiment of the present invention. FIG. 6*b* shows an image displayed in a zoom mode in an embodiment of the present invention. Referring to FIGS. 5, 6*a*, and 6*b*, through the aforementioned operation mode, in FIG. 6*b*, the image in FIG. 6*a* is zoomed in along the vertical axis, thereby achieving the zooming function in this embodiment, solving the problem of image zooming, enhancing the comfort of the user of the flat panel display, preventing the TFT from being charged improperly, and enhancing the image quality.

Figure 7:
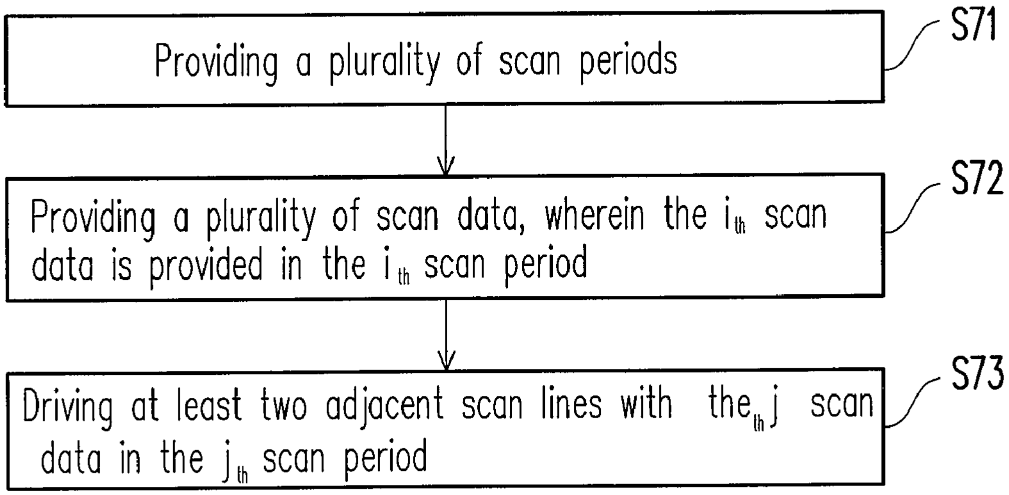
FIG. 7 is a flow chart illustrating the method for zooming an image in an embodiment of the present invention.

FIG. 7 is a flow chart illustrating the method for zooming an image in an embodiment of the present invention. Referring to FIGS. 7 and 5, firstly, in Step S71, a plurality of scan periods are provided. Next, in Step S72, a plurality of scan data are provided. The $i_{th}$ scan data dai is provided in the $i_{th}$ scan period spi, for example the relationship between of the scan period and the scan data in the lower part of FIG. 5.

After that, in Step S73, in the $j_{th}$ scan period, at least two adjacent scan lines are driven with the $j_{th}$ scan data. As shown in the figure, in the third scan period sp3, the adjacent second and third scan lines are driven with the third scan data da3, and in the sixth scan period sp6, the adjacent sixth and seventh scan lines are driven with the sixth scan data, thereby finishing image zooming in this embodiment. In addition, in this embodiment, the scan data lines corresponding to eight output drive signals OUT1-OUT8 are driven with six scan data da2-da7, so as to write the six scan data da2-da7 into the eight capacitors of the TFTs. Therefore, the vertical magnification is 4/3.

It is worthy to mention that in the aforementioned embodiment, although a possible aspect of the method of zooming an image is described, those of ordinary skill in the art should understand that various manufacturers can design the scan driving signal OUT, the output enable signal OE, and the scan clock signal CLKV in different ways. Therefore, the application of the present invention should not be limited to such a possible aspect. In other words, the spirit of the present invention may be satisfied as long as the same scan data is utilized and at least two adjacent scan lines are driven in the same scan period to zoom in an image.

In order to make those of ordinary skill in the art further understand the spirit of the present invention, another embodiment is described below.

Figure 8:
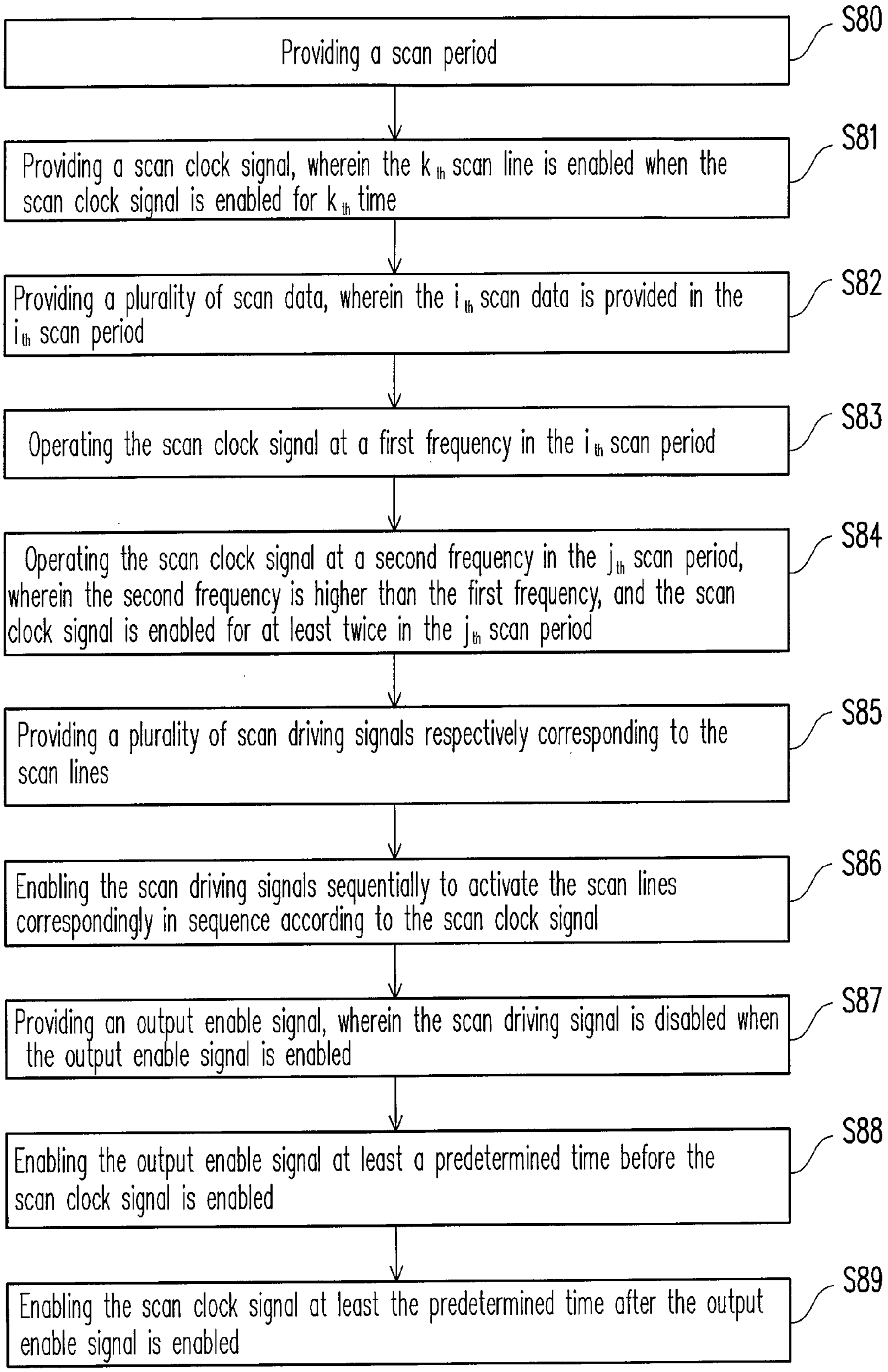
FIG. 8 is a flow chart illustrating the method for zooming an image in another embodiment of the present invention.
Figure 9:
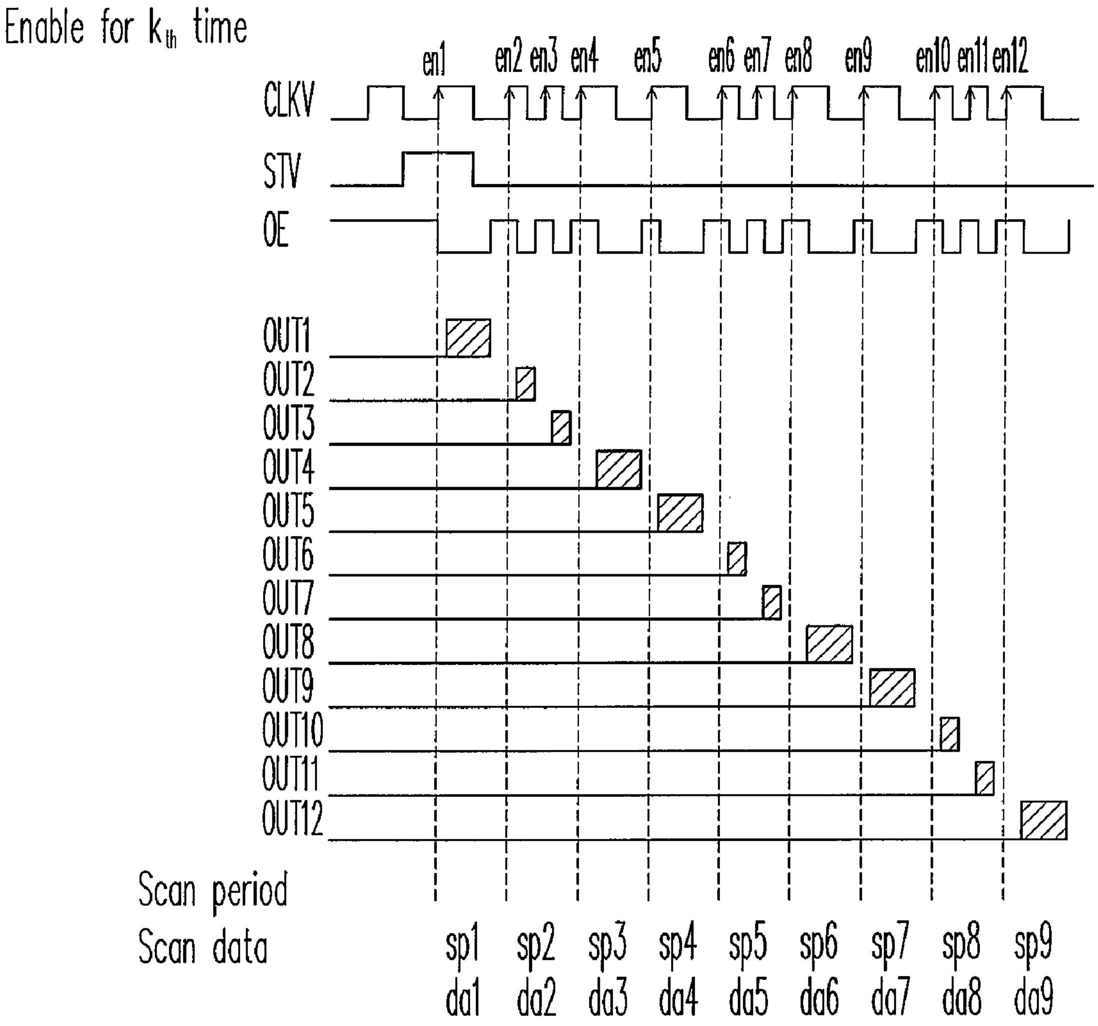
FIG. 9 is a timing chart of the embodiment in FIG. 8.

FIG. 8 is a flow chart illustrating the method for zooming an image in another embodiment of the present invention. FIG. 9 is a timing chart of the embodiment in FIG. 8. Referring to FIGS. 8 and 9, firstly, in Step S80, a scan period is provided, and in Step S81, a scan clock signal (i.e., CKLV in FIG. 9) is provided. If the scan clock signal is enabled for the $k_{th}$ time, the $k_{th}$ scan line is activated. In step S82, the scan data is provided, i.e., da1-da9 in FIG. 9.

Then, in Step S83, in the $i_{th}$ scan period, the scan clock signal operates at a first frequency, such as the frequency in the scan periods sp1, sp3-4, and sp6-9 in FIG. 9. The first frequency is enabled once in one scan period. In Step S84, in the $j_{th}$ scan period, the scan clock signal operates at a second frequency, such as the frequency in the scan periods sp2 and scan period sp5 in FIG. 9. The second frequency is enabled twice in one scan period. Therefore, the second frequency is higher than the first frequency.

In Step S85, a plurality of scan driving signals respectively corresponding to the scan lines are provided, such as the scan driving signals OUT1-OUT12 in FIG. 9. Then, in Step S86, according to the scan clock signal, the scan driving signals are enabled sequentially to activate the scan lines correspondingly in sequence. In FIG. 9, when the scan clock signal CKLV enables the scan driving signals OUT1-OUT12 sequentially, the scan lines 1-12 are enabled correspondingly to write the scan data da1-da9 in the corresponding scan periods 1-9 into the capacitors of the TFTs.

Then, in Step S87, an output enable signal is provided, and when the output enable signal is enabled, the scan driving signal is disabled. Subsequently, in Steps S88 and S89, the output enable signal is enabled at least a predetermined time before the scan clock signal is enabled, and the scan clock signal is disabled at least the predetermined time after the output enable signal is enabled.

For example, as shown in FIG. 9, when the activating signal STV is enabled, after the scan clock signal CLKV is enabled for the first time en1, the scan driving signal OUT1 is enabled till the output enable signal is enabled and the scan driving signal OUT1 is disabled. Subsequently, the scan clock signal CLKV is enabled for the second time en2, and after the output enable signal OE is disabled, the scan driving signal OUT2 is enabled. Referring to FIG. 9 carefully, the time from enabling the scan clock signal CLKV for the second time en2 to disabling the output enable signal OE is just equal to the predetermined time. In a similar way, the time from enabling the output enable signal OE to enabling the scan clock signal CLKV for the second time en2 is longer than the predetermined time. As such, the TFT is prevented from being charged improperly and the image quality is enhanced.

According to Steps S80~S89, in the second scan period sp2, the scan data da2 drives the adjacent second and third scan lines, and in the fifth scan period sp5, the scan data da5 drives the adjacent sixth and seventh scan lines, thereby accomplishing the function of image zooming in this embodiment. In this embodiment, the scan data lines corresponding to twelve output drive signals OUT1-OUT12 are driven with nine scan data da1-da9, so as to write the nine scan data da1-da9 into the eight capacitors of the TFTs. Therefore, the vertical magnification is 4/3.

Those of ordinary skill in the art should understand various manufacturers can design the method of driving at least two adjacent scan lines with the scan data in different ways without departing from the spirit of the present invention, the image may be zoomed and the image quality may be enhanced through the present invention, such that when viewing the flat panel display, the consumer may feel more comfortable as compared with the conventional one. Therefore, the application of the present invention should not be limited to the combination of enabling/disabling the output enable signal and changing the frequency of the scan clock signal CKLV in the aforementioned embodiments.

In view of the above, in the method of zooming an image provided by the present invention, a plurality of scan periods and a plurality of scan data are provided, in which one scan period provides one scan data. And in the same scan period, at least two adjacent scan lines are driven with the same scan data, thereby achieving the purposes of enhancing the functions of the flat panel display module, solving the problem of image zooming, enhancing the comfort of the viewers of the flat panel display, preventing the TFT from being charged improperly, and enhancing the image quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for zooming an image, used for a flat panel display having a plurality of scan lines, the method comprising:

providing a plurality of scan periods;

providing a scan clock signal, wherein when the scan clock signal is enabled for $k_{th}$ time, a $k_{th}$ scan line is activated, wherein k is a natural number;

providing a plurality of scan data, wherein an $i_{th}$ scan period provides $i_{th}$ scan data;

in the $i_{th}$ scan period, operating the scan clock signal at a first frequency;

in a $j_{th}$ scan period, driving at least two adjacent scan lines with the $j_{th}$ scan data, wherein i and j are natural numbers; and in the $j_{th}$ scan period, operating the scan clock signal at a second frequency, wherein the second frequency is higher than the first frequency, and in the $j_{th}$ scan period, the scan clock signal is enabled for at least twice.

2. The method for zooming an image as claimed in claim 1, further comprising:

providing a plurality of scan driving signals corresponding to the scan lines respectively;

enabling the scan driving signals sequentially to activate the scan lines correspondingly in sequence according to the scan clock signal;

providing an output enable signal, wherein when the output enable signal is enabled, the scan driving signals are disabled;

enabling the output enable signal at least a predetermined time before the scan clock signal is enabled; and disabling the output enable signal at least the predetermined time after the scan clock signal is enabled.

3. The method for zooming an image as claimed in claim 2, wherein the time of enabling the output enable signal is smaller than the scan period.

4. The method for zooming an image as claimed in claim 1, wherein the flat panel display is an LCD.

* * * * *